Nov. 18, 1958

L. W. BIRBAUM 2,860,433

SLIDE SELECTOR

Filed Oct. 17, 1956

INVENTOR.
LESTER W. BIRBAUM
BY John W. Michael
ATTORNEY

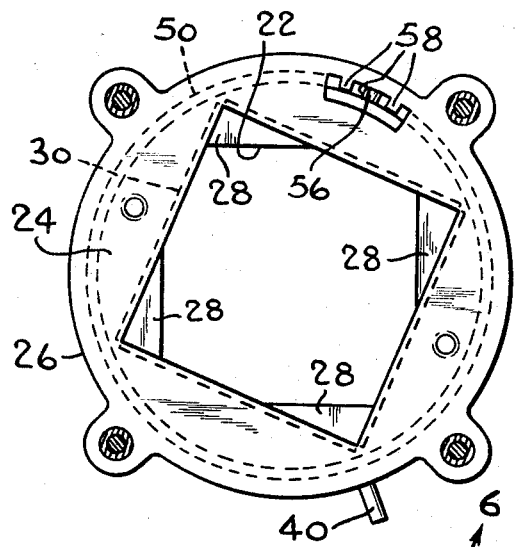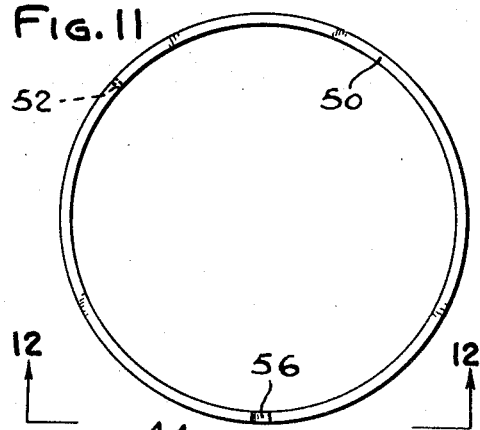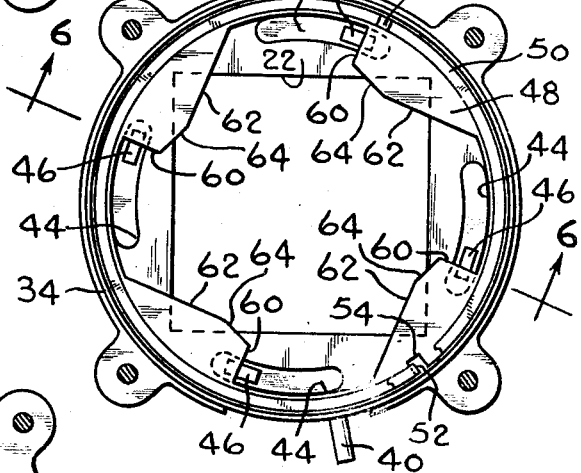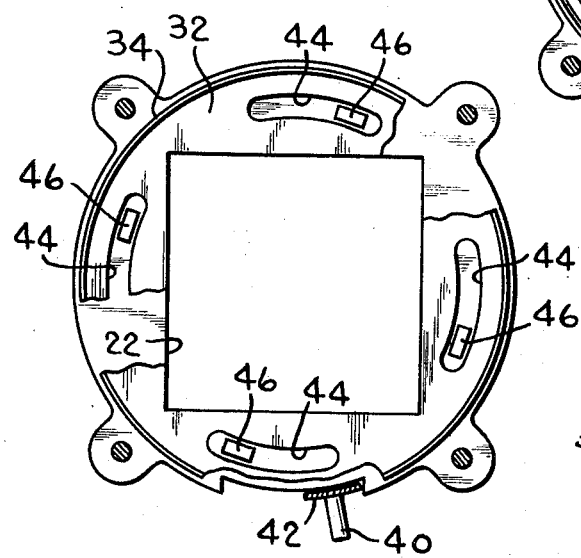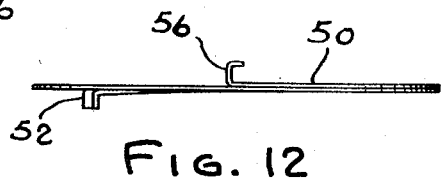

INVENTOR.
LESTER W. BIRBAUM
BY John W. Michael
ATTORNEY

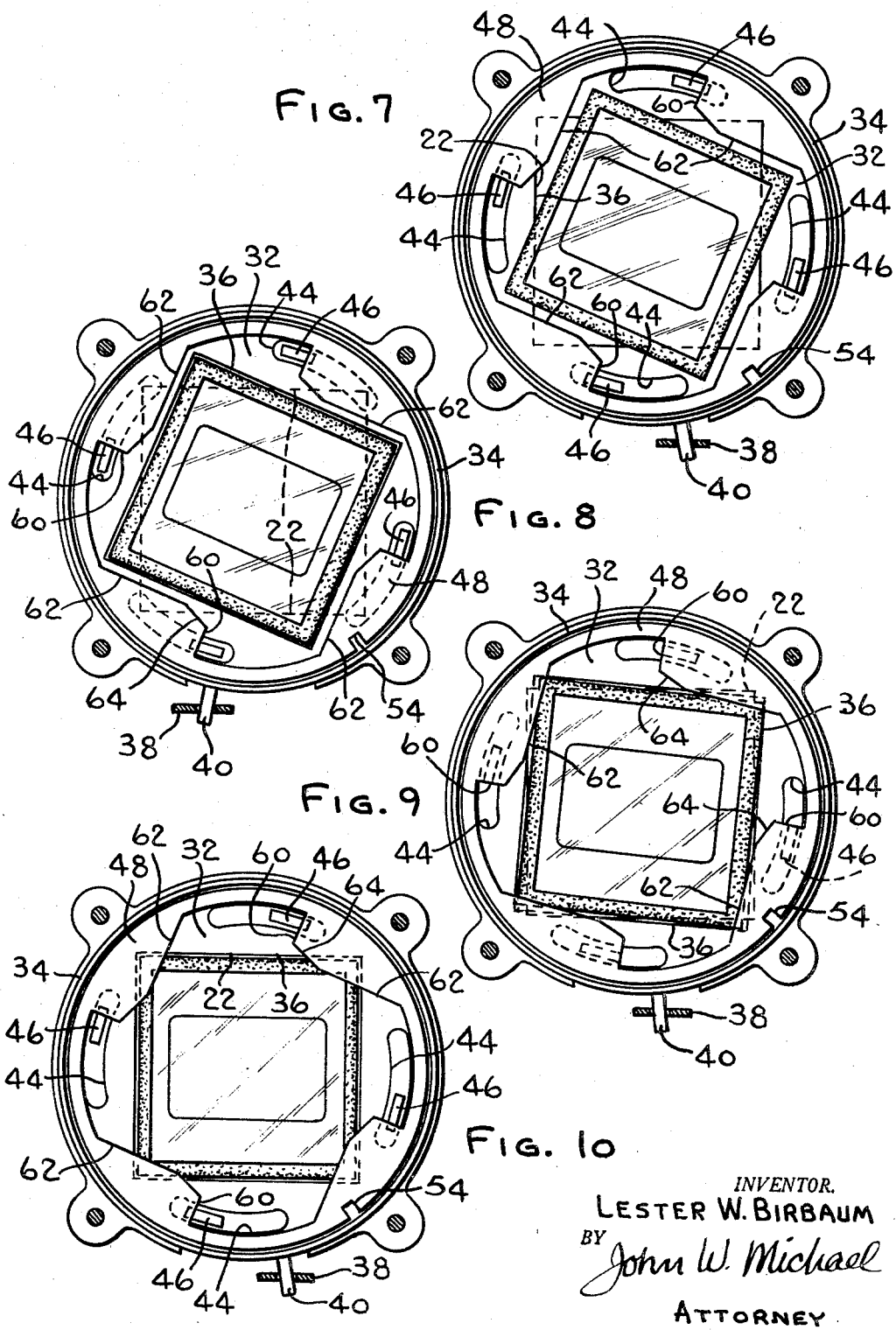

United States Patent Office 2,860,433
Patented Nov. 18, 1958

2,860,433

SLIDE SELECTOR

Lester W. Birbaum, Oconomowoc, Wis., assignor to La Belle Industries, Inc., Oconomowoc, Wis., a corporation of Wisconsin Application October 17, 1956, Serial No. 616,518

7 Claims. (Cl. 40—78)

This invention relates to an improved slide selector or feeding mechanism for selecting the lowermost slide of a stack of horizontally disposed slides in a magazine mounted in the selector head. This invention is an improvement over the type shown in Patent No. 2,503,239 in that the present selector permits intermixing paper and glass mounted slides while the patented structure can only handle one type of slide mount at a time. The patented structure was further deficient in that slides having a thickness falling in the range of .050 to .080 inch were not suited to automatic selection in the projector. The present improvement permits handling such slides with the same ease as other sides.

The object of this invention, therefore, is to improve upon the selector head of said patent to permit intermixing of paper and glass mounted slides of all common thickness.

Another object of this invention is to provide a slide selector head capable of handling slides of all thicknesses without any adjustments or presetting of the mechanism other than normal factory setting.

Other objects and advantages will be pointed out in, or be apparent from, the specifications and claims, as will obvious modifications of the single embodiment shown in the drawings in which:

Figure 3 is a section taken as indicated by line 3—3 on Figure 2, and shows the selector head with the top plate removed.

Figure 4 is another view of the selector head and shows the mechanism with the cover plate removed to expose the parts lying below;

Figure 5 shows the spacer or stop plate removed from Figure 4;

Figure 7 is similar to Figure 4 but shows a slide in position at the start of an operating cycle;

Figure 8 is similar to Figure 7 but shows another step in the operating cycle.

Figure 9 shows still another stage of the operating cycle;

Figure 10 shows the slide at the instant it is dropped into the outlet of the selector head;

Figure 11 is a plan view of a spring used in biasing the spacer or stop plate in the selector head;

Figure 12 is a side elevation of the spring shown in Figure 11;

Figure 1:
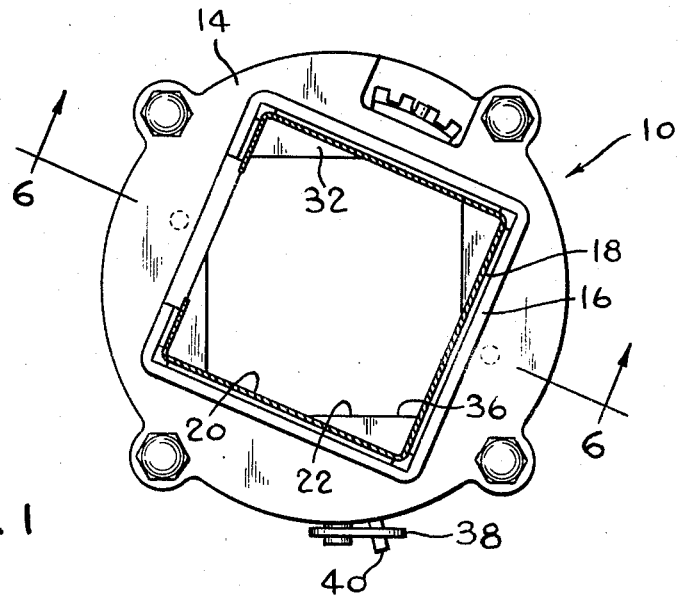
Figure 1 is a top plan view of the selector head.
Figure 2:
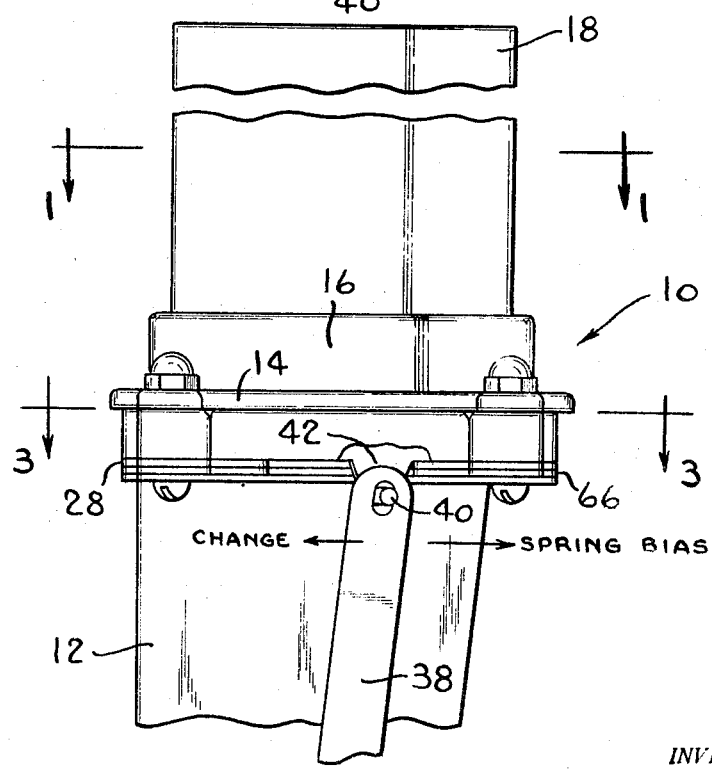
Figure 2 is a side elevation of the selector head mounted on a feed chute and provided with an actuator.

Referring now to the drawings in detail, the selector head 10 is adapted to be mounted horizontally on top of a feed chute 12, the details of which are not important here, and is provided with top plate 14 having upstanding flange 16 defining an aperture receiving a feed magazine 18 which is mounted in a vertical position as shown in Figure 2 so that the slides within the magazine lie horizontally, one on top of the other. Gravity or an auxiliary weight can be employed to feed the slides downwardly. As may be seen in Figure 1, the feed aperture or inlet 20 is angularly offset with respect to the outlet 22 of the selector head. Below top plate 14 is cover plate 24 which has a depending peripheral flange 26 butting against base plate 28 while the interior flange 30 projects inside the central feed aperture 20 to guide slides from the feed magazine down to the actual selecting mechanism. The inner flange 30 is cut out as required to permit the necessary motion of the slides during their rotation by the selecting mechanism into alignment with the outlet of the selector head. Selector plate 32 is rotatably mounted on top of the base plate 28 and is provided with a peripheral rim 34 adapted to fit within the cover plate rather snugly so as to constrain the selector plate to rotary motion without undue binding and without vertical motion. The selector plate is provided with a square central aperture 36 which is adapted to alternately register with the feed aperture or inlet 20 or the outlet 22. A spring, not shown, acting on the actuating lever 38 urges the selector plate into registry with outlet 22 by reason of the interconnection of the lever 38 and pin 40 projecting from finger 42 depending from the selector plate. The spring bias is shown as far as necessary by means of the legend and arrow applied to Figure 2.

Figure 6:
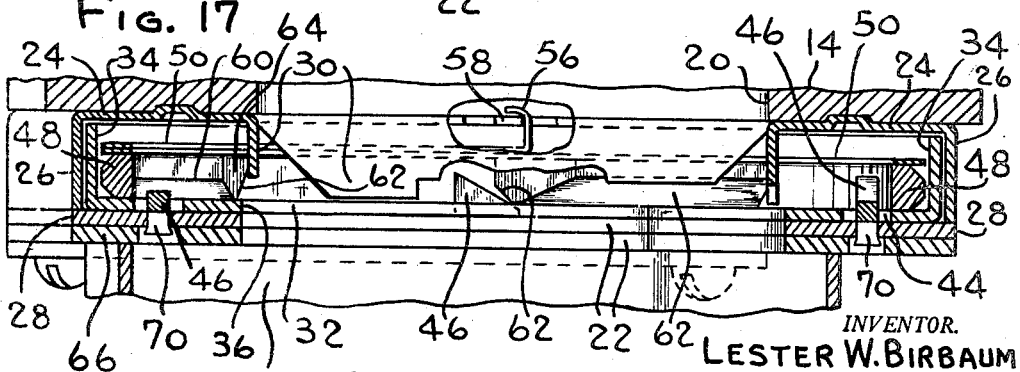
Figure 6 is a section through the selector head as indicated by line 6—6 in Figure 1.

As may be seen in Figure 5 the selector plate is provided with four spaced apertures 44 through which cams 46 mounted on base plate 28 may project during all stages of rotation of the selector plate. Looking at cams 46 in Figure 5, the slope of the cam surface is an increasing one as one goes about the figure in a counter-clockwise direction. These cams are adapted to elevate spacer or stop plate 48 as it rotates in a counter-clockwise direction from the position shown in Figure 4. The spacer plate is biased in a clockwise direction (indicated on Figure 4) by means of spring 50 which has a depending finger 52 projecting into notch 54 in the spacer plate and having a hook 56 at its other end hooked over a suitable notch 58 in cover plate as shown in Figures 3 and 6. The spacer is biased downwardly against selector plate 32 by gravity.

Reference to the drawings will illustrate that the spacer plate is provided with four somewhat trangular portions projecting inwardly from the outer rim of the plate. Each of these projections is provided with a cam face 60 adapted to ride up the inclined surface of cam 46 as the spacer plate is moved in a counter-clockwise direction from the position shown in Figure 4. The spacer plate projections are additionally provided with beveled surfaces 62 against which the slides act if they are of sufficient thickness as will become more apparent hereinafter. When a slide so acts on the spacer plate bevel it tends to push the slide down against base plate 28 and the bevel also assists in raising spacer plate until the slide may slip underneath the spacer. The outer corners 64 on the spacer plate projections are cut off as indicated to avoid striking the depending inner flange 30 of the cover plate when the spacer plate is rotated to its fullest extent in the counter-clockwise direction from the position shown in Figure 4.

Plate 66 below the base plate is suitably apertured to receive the peened ends 70 of cams 46 so the entire selector head may be flush mounted on the feed chute.

When it is desired to change or select a slide by means of the present selector head, the change lever 38 is moved in the direction of the arrow shown on Figure 2 to rotate the selector plate 32 from the position shown in Figures 1 through 5 wherein the selector plate aperture 36 is in alignment with the selector head outlet 22 to a position in which the aperture 36 is aligned with the angularly offset feed aperture or inlet 20. Until the selector plate aperture 36 is so aligned with the feed aperture the lowermost slide in the feed magazine 18 will rest on top of the selector plate. But when the selector plate has been rotated sufficiently to line up with the feed aperture, the lowermost slide will drop into the aperture in the selector plate, so that the selected slide now rests on top of base plate 28 but is effectively engaged by the selector plate as the actuating lever 38 returns to its illustrated position under the bias of its spring. The selector plate will rotate the selected slide about a vertical axis until the slide lines up with the outlet 22 in the base plate and bottom plate 66. When the slide is so aligned, the slide can drop through the outlet and go on down through the feed chute, the manner of handling the slide in the feed chute thereafter being of no concern here.

The operating procedure just described is shown in Figures 7 through 10. In Figure 7 the slide is resting on top of the selector plate while in Figure 8 the selector plate has been rotated so that it now lines up with the feed aperture and thus lines up with the slide whereupon the slide can drop into the opening in the selector plate. Now then, as the selector plate rotates in the counter-clockwise direction as illustrated in Figure 9 the slide is carried therewith and in Figure 10 the slide is illustrated in alignment with outlet 22 of the selector head.

Reference to Figure 9 will illustrate a point not stressed heretofore. As the slide is moved partially under the projection on spacer or stop plate 48 and if the slide is of sufficient thickness so that it cannot pass underneath the spacer plate without butting against the beveled face 62, it will, of course, bear against face 62. This in turn, transmits driving force to the spacer plate tending to rotate the spacer plate counterclockwise against the bias of spring 50. And as the spacer plate rotates in this manner the rear cam surface 60 on the plate rides up cam 46 to raise the spacer against the downward bias of gravity. This continues until the spacer plate has risen sufficiently for the slide to pass underneath the spacer. At the moment the spacer plate clears the selected slide, the bias of spring 50 comes into play and prevents further counter-clockwise rotation by the spacer plate and tends to return the spacer plate to its original position.

Figure 13:
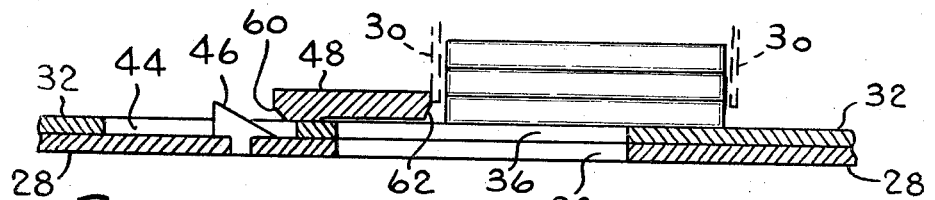
Figure 13 is a somewhat schematic representation of the parts in their positions at the start of the operating cycle.
Figure 14:
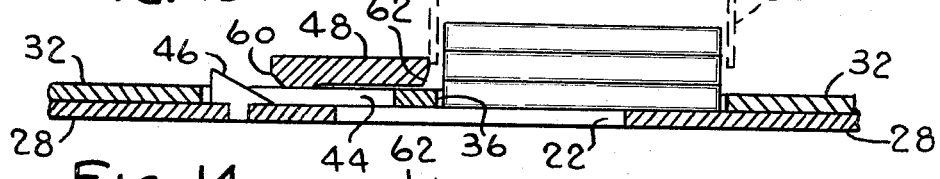
Figure 14 shows the next step in the operating cycle, and might be said to correspond to Figure 8.
Figure 15:
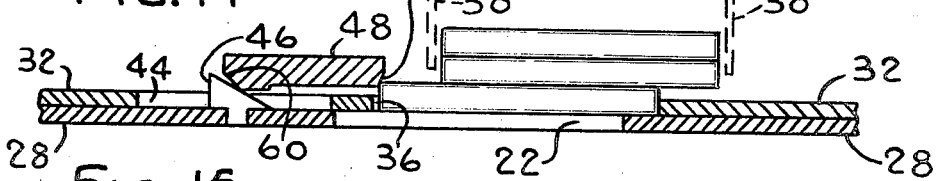
Figure 15 shows a still further step in the operating cycle and corresponds to Figure 9.
Figures 16, 18:
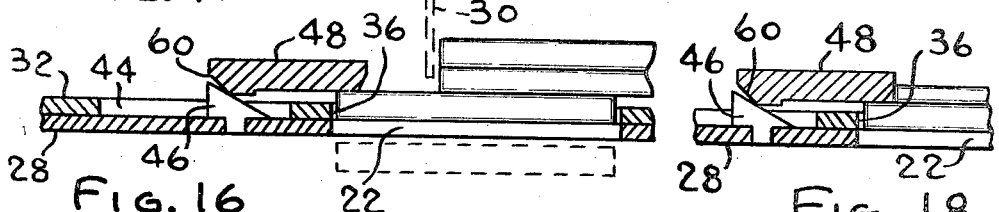
Figure 16 shows a completion of an operating cycle.
Figure 18 shows a manner of operation when dealing with slides of mixed sizes.

The action just described is illustrated schematically in the Figures 13 through 16 wherein the rotational movement has been translated to a straight reciprocable action for the purpose of facilitating the disclosure. The parts are numbered as the parts in the rotary embodiment and this should facilitate understanding of the drawing. In Figure 13 the stack of slides lies horizontally in the feed magazine aperture 30 and on the selector plate 32 which is not in registry with the feed inlet but is in registry with the outlet. In Figure 14 selector plate 32 has been moved to the right so that the lowermost slide can drop into the aperture 36 in the selector plate where it rests on top of base plate 28. In Figure 15 the selector plate is shown moving towards the left to move the selected slide into registry with the offset outlet. It can be seen that the upper left hand corner of the selected slide is acting on beveled face 62 of spacer plate 48 while cam face 60 on the spacer plate is riding up cam 46 to elevate the spacer plate. In Figure 16 the spacer plate is shown in its elevated position in which it rides over or permits the selected slide to pass under the spacer plate so the selected slide can drop through the outlet 22 as shown in the dotted line position. Now considering Figure 16, it will be appreciated that if it were possible for the slide next following the selected slide to tend to follow the selected slide, there would be no direct driving force applied to the next following slide but there would be only frictional engagement between the selected slide and the following slide tending to carry the following slide along. It can be seen in Figure 16 that the spacer plate is in position to obstruct following action of the following slide as soon as the spacer plate clears the selected slide. Since the spacer plate is spring biased, it exerts a positive force on the following slide overcoming the frictional tendency of the following slide to go along with the selected slide. This is of importance since it limits the selecting mechanism to selection of but one slide at a time and the action of the spacer plate is important in that it will gage the thickness of the selected slide and rise until the selected slide can pass under the spacer plate and the spacer plate then acts to obstruct any following slide.

Figure 17:
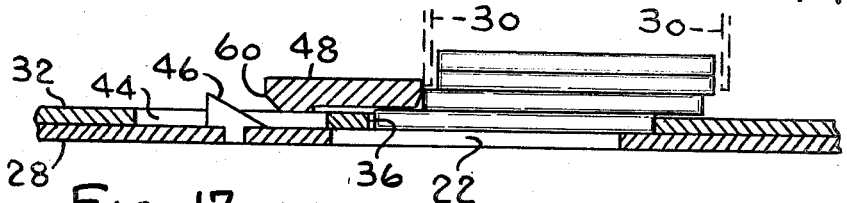
Figure 17 shows the manner of operation when dealing with thinner slides than shown in Figures 13 to 16.

In Figure 17 the action of the spacer plate is illustrated when a very thin, say paper mounted, slide is being selected. If this slide is extremely thin it can pass under the spacer plate as shown without lifting the spacer plate or moving the spacer plate back against the cam at all. It will be seen in this figure that the spacer plate is now obstructing movement of the next following slide just as it would if it were first moved up the cam 46 by the selected slide.

In Figure 18, there can be seen the action of the present selector mechanism wherein the slides are intermixed. Thus, the selected slide in the figure is a glass mounted slide which has occasioned the spacer plate 48 to rise up until it can clear the glass mounted slide and at the same time obstruct the following action on the next slide which, in this case, is illustrated as a paper mounted slide. In the case of quite thick slides the tendency of the next following slide to go along with the selected slide does not really come into play due to the presence of the depending flange 30 on cover plate 24, but the action is necessary in order to accommodate all slides of various thicknesses.

The bevel 62 on the spacer is at an angle of approximately 20 degrees from the vertical and this angle has been found to be somewhat critical. If the bevel were not present at all so the face struck by the selected slide was vertical, the selected slide would tend to rise up with the spacer plate and thus would not drop through the outlet of the selector head. If the bevel is increased, the slide itself tends to cam the spacer plate up and this in turn eliminates the controlled action imparted to the spacer plate by the fixed cam mounted in the base plate. Furthermore, this has a tendency to increase the wear on the slides and thus damage the slides. Through extensive experimentation, it has been found that the angle 20 degrees is most satisfactory under all circumstances. These experiments also indicate that there is what may be termed a critical range of about 17 to 22 degrees for this bevel and any less or more will have an adverse influence on the operation of the selector head.

While the description with respect to Figures 13 through 18 has been related to a reciprocatory action, it will be appreciated that the same operation follows with respect to the illustrated structure in Figures 1 through 12 except that the in line motion is a rotary motion. In this connection, however, it should be observed that the schematic illustration in Figures 13 through 18 does point out that the applicability of the present invention to a reciprocatory action instead of a rotary motion. For this reason, the term "offset inlet and outlet" used in the claims is not to be taken as restrictive to the rotary action illustrated in Figures 7 through 10. The offset construction may embrace an angular offset or a lateral offset.

Although but one embodiment of the present invention has been illustrated and described, it will be apparent to those skilled in the art that various changes and modifications may be made therein without departing from the spirit of the invention or from the scope of the appended claims.

What I claim is:

1. A slide selector comprising, a head having an inlet and an outlet offset from the inlet, the inlet and outlet respectively receiving and discharging slides in paths of motion generally normal to the plane of the slides, selector means movable between the inlet and the outlet for engaging the slide at the inlet and transporting the selected slide to the outlet, movement of the selected slide from the inlet to the outlet being in the plane of the slide, stop means operable to gage the thickness of the selected slide and to permit transport of the selected slide to the outlet while obstructing similar movement of any succeeding slide concurrently with the selected slide, means biasing said stop means to a position in which the selected slide being moved from the inlet to the outlet may engage the stop means at which time the stop means tends to move with the selected slide, means mounting the stop means in said head and including means for raising the stop means as the selected slide engaging it moves toward the outlet until the stop means clears the selected slide and engages any following slide tending to follow the selected slide, the biasing means acting on the stop means being operative to resist further movement of the stop means with the selected slide so the stop means resists movement of any following slide tending to follow the selected slide.

2. A slide selector according to claim 1 in which the stop means is provided with a beveled face against which the selected slide acts, the face being beveled in the direction tending to hold the slide toward the outlet.

3. A selector according to claim 2 in which the inlet and the outlet are angularly offset and the selector means is rotatable between registry with the inlet and the outlet.

4. Slide feeding apparatus comprising, a head having an inlet and an offset outlet, said inlet including means for receiving a slide magazine in which the slides are stacked to move into the inlet along the line normal to the plane of the slides, a selector movable in a plane generally parallel to the planes of the slides between positions in which it registers with the inlet and the outlet, means biasing the slides into the inlet for engagement by the selector when it is registered with the inlet, spacer means operable to gage the thickness of the selected slide to permit movement of the selected slide only to the outlet by blocking similar movement of any following slides, said selector comprising an apertured plate into which the selected slide drops when the selector plate aperture registers with the inlet and which drivingly engages the selected slide to transport it to the outlet, said outlet being in a base plate, said selector moving over the base plate and the selected slide resting on the base plate during the movement from the inlet to the outlet, said spacer means being movably mounted above the selector and the selected slide acting on the spacer means to tend to move the spacer means along with the selector, means biasing the spacer means to resist such movement, means for raising the spacer means as the selector slide moves it against its bias until the spacer means rises enough to permit the selected slide to pass under the spacer means, the spacer means thereafter acting to block movement of any succeeding slide tending to follow the selected slide.

5. Apparatus according to claim 4 in which the raising means comprises stationary cam means on the base plate, the spacer means acting on the cam means and being elevated thereby when a selected slide is moved against the spacer means.

6. Apparatus according to claim 5 in which the face of the spacer means against which the selected slide acts is beveled downwardly to tend to hold the selected slide against the base plate.

7. Apparatus according to claim 6 in which said face of the spacer is beveled between 17 and 22 degrees from vertical.

References Cited in the file of this patent

UNITED STATES PATENTS

| | | |
|---|---|---|
| 2,503,239 | Antos | Apr. 11, 1950 |
| 2,533,441 | Estes | Dec. 12, 1950 |
| 2,594,162 | Hartley | Apr. 22, 1952 |
| 2,705,437 | Lessman | Apr. 5, 1955 |